United States Patent
Tsaur et al.

(10) Patent No.: US 8,386,733 B1
(45) Date of Patent: Feb. 26, 2013

(54) METHOD AND APPARATUS FOR PERFORMING FILE-LEVEL RESTORATION FROM A BLOCK-BASED BACKUP FILE STORED ON A SEQUENTIAL STORAGE DEVICE

(75) Inventors: Ynn-Pyng Tsaur, Oviedo, FL (US); Russell R. Stringham, Orem, UT (US); Suren Sethumadhavan, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 663 days.

(21) Appl. No.: 12/070,178

(22) Filed: Feb. 15, 2008

(51) Int. Cl.
*G06F 12/00* (2006.01)
(52) U.S. Cl. ........................ 711/163; 711/162
(58) Field of Classification Search ................. 711/162
See application file for complete search history.

(56) References Cited

U.S. PATENT DOCUMENTS

| | | | | |
|---|---|---|---|---|
| 5,948,057 A | * | 9/1999 | Berger et al. | 709/205 |
| 7,062,541 B1 | * | 6/2006 | Cannon et al. | 709/219 |
| 7,809,692 B1 | * | 10/2010 | Pruthi et al. | 707/674 |

OTHER PUBLICATIONS

"Backup Express: Express Image," downloaded from web site htttb://www.syncsort.com/PDF/bexds_expressimage.pdf, © 2008 Syncsort Incorporated.

* cited by examiner

*Primary Examiner* — Yong Choe
*Assistant Examiner* — Hamdy S Ahmed
(74) *Attorney, Agent, or Firm* — Campbell Stephenson LLP

(57) ABSTRACT

A method and apparatus for performing file-level restoration from a block-based backup file stored on a sequential storage device is described. In one embodiment, a method of processing a backup file to perform file-level restoration from a sequential storage device comprises generating extent information, wherein the extent information pertains to at least one file system object associated with a backup file, wherein the backup file is to be stored on a sequential storage device, wherein the backup file is block-based and processing a backup catalog, wherein the backup catalog indicates locations of various portions of the extent information and is used to restore a file system object.

20 Claims, 8 Drawing Sheets

METHOD AND APPARATUS FOR PERFORMING FILE-LEVEL RESTORATION FROM A BLOCK-BASED BACKUP FILE STORED ON A SEQUENTIAL STORAGE DEVICE

BACKGROUND OF THE INVENTION

1. Field of the Invention

Embodiments of the present invention generally relate to data protection systems and, more particularly, to a method and apparatus for performing file-level restoration from a block-based backup file stored on a sequential storage device.

2. Description of the Related Art

A computing environment may utilize stored data for various operations. The data may be stored within one or more storage devices (e.g., RAID disk array, tape drives, hard disk drive and the like). The data may be sensitive (e.g., privileged information, health records, identification information and the like) and/or important to the operations of the computing environment. A sudden loss or corruption of the data, however, disrupts the operations of the computing environment and causes a significant decrease in productivity. Accordingly, the computing environment employs various forms of backup systems to protect the data such that the data may be recovered by the computing environment.

Normally, a backup system creates a backup file, such as an image file or a virtual disk file, comprising one or more fragment files arranged in an disk image format (e.g., Virtual Hard Disk (VHD), Virtual Machine Disk Format (VMDK), Virtual Volume Image (V2i) and the like) for a volume (e.g., a plurality of objects organized in accordance with a file system, such as New Technology File System (NTFS), File Allocation Table (FAT) and the like). The plurality of objects that form the volume may include files. The backup file may be block-based (i.e., volume-based). The backup system may create a base backup file (e.g., an image file or a virtual disk file representing a full backup of the volume) followed by a number of incremental backup files (e.g., a number of image files or virtual disk files where each backup file comprises data that has changed since a previous backup file). The base backup file and the number of incremental backup files form a backup chain (e.g., an image file chain). The backup chain represents various states of the volume (e.g., states of the plurality of objects associated with time).

Occasionally, objects (e.g., files and directories) are to be restored from the backup chain stored on a source storage device (e.g., a sequential storage device) to a destination storage device (e.g., hard disk drive). For example, a particular file on the destination storage device may be corrupted or accidently deleted. Moreover, the computing environment may simply desire to restore data for the particular file from a particular point in time.

Currently, the entire volume must be restored in order to restore the particular file or the backup file must be copied to a random access device (i.e. disk). Sequential storage devices do not support random access of the particular file. Hence, the computing environment cannot mount a backup file as a volume, image or virtual disk and access the particular file directly from the tape. Consequently, a large amount of disk space in the destination storage device is needed to store the restored volume. If the computing environment desires to restore the volume to a state that existed before a recent loss of data (i.e., after that last backup), the backup system initiates a restoration process. To restore a single file, the backup file must be transferred to the destination storage device, a random access device so that it can be mounted, allowing the desired file to then be copied to the destination storage device or any other storage device.

Therefore, there is a need in the art for a method and apparatus for performing file-level restoration from a block-based backup file stored on a sequential storage device, such as a tape drive.

SUMMARY OF THE INVENTION

Embodiments of the present invention generally comprise a method and apparatus for processing a block-based backup file to perform file-level restoration from a sequential storage device. In one embodiment, a method comprises generating extent information, wherein the extent information pertains to at least one file system object associated with a backup file, wherein the backup file is to be stored on a sequential storage device, wherein the backup file is block-based and processing a backup catalog, wherein the backup catalog indicates locations of various portions of the extent information and is used to restore a file system object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
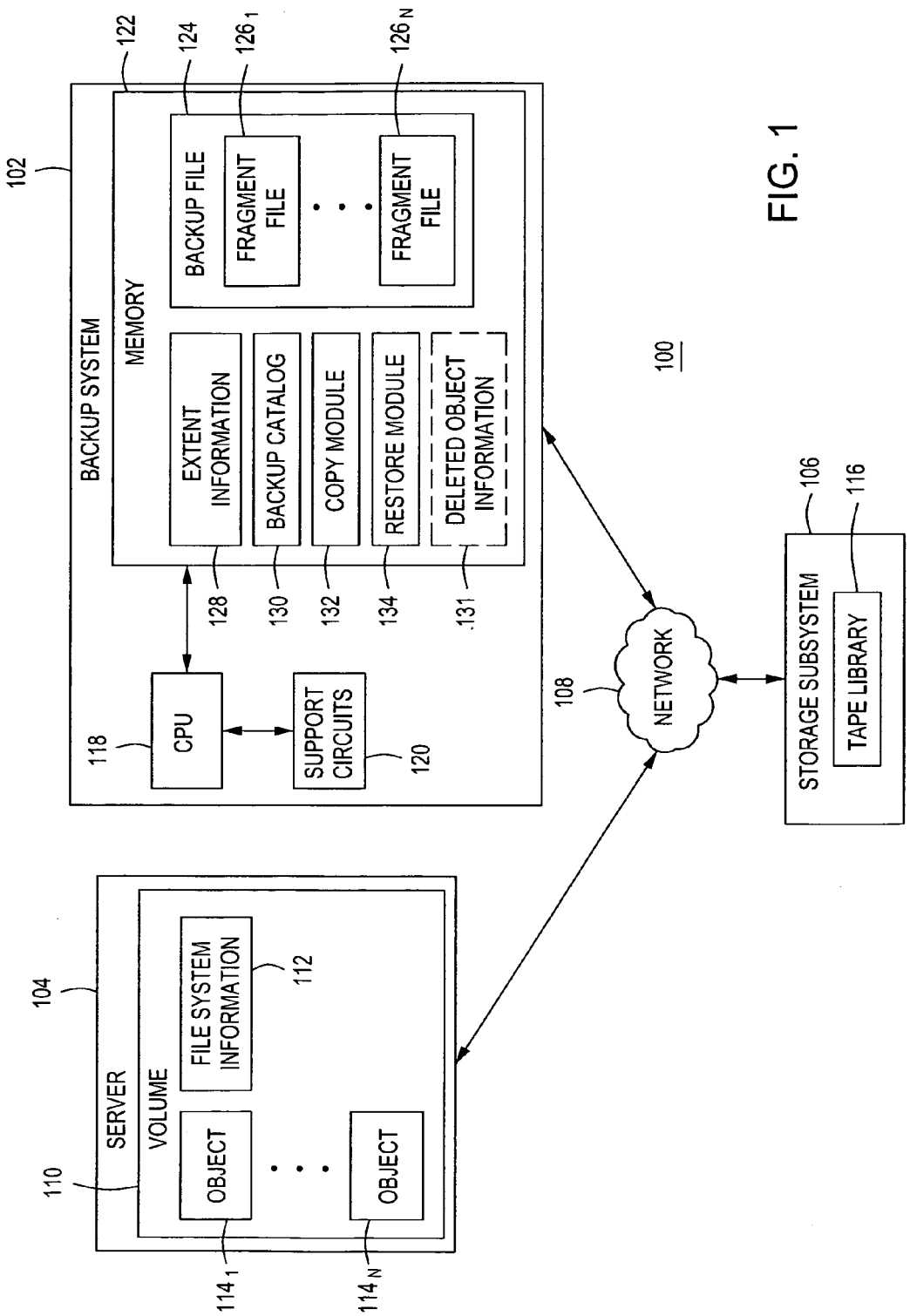
FIG. 1 is a block diagram of a system for performing file-level restoration according to one or more embodiments of the present invention.

FIG. 1 is a block diagram of a system 100 for performing file-level restoration according to one or more embodiments of the present invention. The system 100 comprises a backup system 102, a server 104 and a storage system 106, each coupled to one another through a network 108.

Generally, the storage subsystem 106 is a collection of data storage technologies (e.g., magnetic tape libraries, ATA disk arrays, Fibre Channel disk arrays, ISCSI (Internet SCSI) block devices and the like). The storage subsystem 106 comprises a plurality of storage volumes for storing data for data protection tasks (e.g., backup, duplicate or restore). In one embodiment, the storage subsystem 106 comprises sequential storage devices, such as a tape library 116. The tape library 116 comprises one or more magnetic tape cartridges and one or more tape drives. Generally, a tape drive is a sequential storage device that is configured to store and maintain data stored on magnetic tape.

The network 108 comprises a communication system that connects a computer system by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, Fibre Channel, WiFi, WiMax, General Packet Radio Service (GPRS), and the like.

The server 104 comprises a volume 110. Generally, the volume 110 comprises data organized and managed in accordance with a file system (e.g., New Technology File System (NTFS)). In one embodiment, the volume 110 further includes file system information 112 and a plurality of objects 114 (e.g., file system objects, such as files and directories). The file system information 112 represents the organization, description and content of the plurality of objects 114 that forms at least a portion the volume 110. As such, the file system information 112 is the foundation of the volume 110. In one embodiment, the file system information includes metadata and/or offset mapping information, as described below. In another embodiment, the file system information 112 is a Master File Table (MFT) including any non-resident information associated with any record of the Master File Table (e.g., non-resident data or attribute records). In this embodiment, the Master File Table comprises a plurality of records defining the plurality of objects 114 that form the volume 110.

The backup system 102 comprises a central processing unit (CPU) 118, various support circuits 120 and a memory 122. The CPU 118 may be one or more of any commercially available microprocessors or microcontrollers. The various support circuits 120 facilitate the operation of the CPU 118. The various support circuits 120 include, for example, input/output circuits, system bus, PCI bus, clock circuits, power supplies and the like. The memory 122 may comprise random access memory, read only memory, optical memory, disk drives, removable memory, and the like.

The memory 122 includes a backup file 124 (e.g., a block-based image file or virtual disk file in a format, such as VHD, VMDK, V2i and the like). The backup file 124 comprises a plurality of fragment files 126. The memory 122 further includes various data, such as extent information 128 and a backup catalog 130. Optionally, the memory 122 further includes deleted object information 131. In one optional embodiment, the backup catalog 130 includes the deleted object information 131. The memory 122 further includes various software packages, such as a copy module 132 and a restore module 134. Alternatively, the memory 122 includes a backup chain formed of one or more block-based backup files, such as the backup file 124. In one embodiment, the backup chain comprises a base backup file (e.g., full backup stored in an image file or a virtual disk file) and one or more incremental backup files.

The extent information 128 pertains to extents that form one or more objects of the plurality of objects 114, which are located within the plurality of fragment files 126. In one embodiment, the extent information 128 includes file system metadata (e.g., the file system information 112), volume metadata and/or file offset mapping information. In one embodiment, the file offset mapping information indicates a value representing an offset of an extent (e.g., a contiguous area of memory that comprises data for a portion of an object) for the one or more objects of the plurality of objects 114. The offset is used to locate a particular object (e.g., file system object) stored within the backup file 124. The offset may be a number of bytes from a first address (e.g., an address associated with a beginning of the backup file 124, an address associated with a beginning of a volume in which the backup file 124 resides or the like) to the extent. For example, if the backup file 124 for the volume 110 resides on a second volume, then the offset is relative to the second volume. According to one embodiment, the file offset mapping information further indicates a value representing a size (in bytes) of each offset.

The backup catalog 130 comprises locations for various portions of the extent information 128 as stored on a tape within the tape library 116. In one embodiment, the backup catalog 130 further comprises metadata and file system object offset information for a volume (e.g., offsets of file system object data within the volume 110). In another embodiment, the backup catalog 130 is updated with the locations of the extent information 128 as the extent information 128 and/or the fragment files 126 are copied to the one or more tapes. The backup catalog 130 may include offsets for various portions of the backup file 124 as stored on the one or more tapes (e.g., headers, tape format data blocks and the like). The backup catalog may further include attribute information (e.g., file or directory attributes as used in the file system information 112 (i.e., the MFT)) for the plurality of objects 114. As such, the attribute information may be used to fully restore a file system object to the volume 110 by copying one or more attributes associated with the file system object to the file system information 112. According to one embodiment, the backup catalog 130 may be an XML document to which the restore module 134 may query for the locations of various portions of the extent information 128. As described below, the backup catalog 130 is generated by the copy module 132 and utilized by the restore module 134 to enable file-level restoration of one or more objects (e.g., files) from the fragment files 126 stored on the one or more tapes.

The copy module 132 is a software package configured to process the backup file 124 to facilitate the file-level restoration process. The copy module 132 stores (e.g., copies) the extent information 128, the fragment files 126 and/or the backup catalog 130 to one or more tapes within the tape library 116. In another embodiment, the copy module 132 stores only the fragment files 126 of the backup file 124 on the one or more tapes. In one embodiment, the copy module 132 generates the extent information 128 to indicate locations of various portions of the backup file 124 (e.g., the fragment files 126). The copy module 132 updates the backup catalog 130 to indicate locations on the one or more tapes for various portions of the extent information 128 (e.g., iNode information, extent (i.e., file offset) mapping information and/or metadata for the plurality of objects 114).

The restore module 134 is a software package for performing the file-level restoration process on the backup file 124 as stored on the tape. In accordance with various embodiments, the restore module 134 is configured to restore one or more individual objects (e.g., files and directories) to the volume 110 from one or more tapes within the tape library 116. In one embodiment, the restore module 134 processes (e.g., queries) the backup catalog 130 stored on the one or more tapes for a location of a portion of the extent information 128 that is associated with the one or more individual objects. The portion of the extent information 128 provides file system metadata and/or file offset mapping information that corresponds with the one or more individual objects. The portion is used to restore the one or more individual objects, as explained further below.

The copy module 132 and the restore module 134 cooperate to perform the file-level restoration process on the backup file 124. In one embodiment, the copy module 132 processes and stores the backup file 124 "as is" on the one or more tapes within the tape library 116 along with the extent information 128 and the backup catalog 130. The restore module 134 uses the backup catalog 130 to locate the extent information 128 on a tape in the tape library 116. At this point, the restore module 134 uses the extent information 128 to identify and then, copy data blocks comprising the one or more individual objects to a location (e.g., a newly created file in a computer memory or an appropriate offset in the file system information 112) in a volume (e.g., the volume 110 or any another volume arranged in accordance with a file system).

According to various embodiments, the copy module 132 and the restore module 134 cooperate to perform the file-level restoration process on a full backup file and/or an incremental backup file. For example, the file-level restoration process may be performed on the backup chain comprising the base backup file and/or one or more incremental backup files. In one embodiment, the file-level restoration process may be performed on the backup chain in a reverse order that begins with a last incremental backup file and proceeds backwards on the backup chain until the base backup file or a target point in time is reached (e.g., the file is fully restored). In another embodiment, the file-level restoration process restores any portions of the objects that are required for restoration from the last incremental backup file since the last incremental backup file comprises recently modified and/or added data associated with the objects. Then, the file-level restoration process proceeds to the previous incremental image and restores any portions stored within the previous incremental image that has not been restored previously. This step is repeated for each previous incremental image until the base image and/or until each and every portion of the objects has been fully restored. In one or more embodiments, the extent information 128 may indicate that a particular incremental image does not comprise data associated with the objects. Consequently, the file-level restoration process skips the particular incremental image on the tape. As another alternative, the extent information 128 may be used to identify an incremental backup file that comprises one or more portions of the objects to be restored, as explained further below.

Alternatively, a file stored within the base backup file is restored first and then, the file is updated with associated data stored in each incremental backup file in creation time order. After each restoration of each image, file system metadata (e.g., the file system information 112) is updated with objects that have been modified, deleted or added since a previous incremental backup file. According to one alternate embodiment, modified and added data blocks are copied into the volume 110 and deleted data blocks are removed from the volume 110. In another embodiment, the deleted object information 131 (e.g., a portion of the backup catalog 130) indicates the deleted file, as explained further below.

In one embodiment, the file-level restoration process is performed on a V2i image file. Generally, an image file in the V2i image file format comprises data that may be compressed and/or encrypted. To access one or more objects of the plurality of objects 114 from the fragment files 126, the copy module 132 processes a frame (e.g., a portion of the V2i backup file) that is defined by a compression and/or an encryption boundary. In one embodiment, the copy module 132 and/or the restore module 134 decrypts and/or decompresses the frame in order to access and restore one or more files.

Accordingly, the extent information 128 comprises values for a frame offset (e.g., an offset to a beginning of a frame), a size of the frame, an offset within the frame (e.g., an offset to a beginning of an extent associated with an object) and a size of the extent in the frame. Moreover, the extent information 128 includes V2i extents, which have been converted from sector or byte offsets. In one or more alternative embodiments, the extent information 128 is gathered during generation of a table of contents portion of the V2i backup file. If the V2i backup file is an incremental backup file, the table of contents portion indicates which files have been added, deleted or modified. In another embodiment, the extent information 128 is gathered using a mapping service (e.g., VERITAS Mapping Service (VxMS)). For example, the copy module 132 uses VxMS to open the V2i backup file, access one or more sectors and generate the extent information 128 through an Application Programming Interface (API).

Optionally, the extent information 128 further comprises an identifier that indicates an association between the extent and the frame in the V2i backup file. In one optional embodiment, the identifier is used to determine which incremental image amongst the plurality of incremental images in the backup chain to access. For example, the identifier may indicate an incremental image that comprises a latest version of a particular object (e.g., file) or a most recent modification of the particular object.

In operation, the copy module 132 accesses and collects the extent information 128 from within the backup file 124 using a mapping service (VxMS). In one embodiment, the mapping service returns iNodes for each of the plurality of objects 114. Generally, iNodes identify each object (i.e., file) as well as attributes for the object. In one embodiment, the copy module 132 generates and/or updates the backup catalog 130 with information from the iNodes. Furthermore, the iNode information (e.g., the attribute information) enables the formation of a full path (e.g., in a hierarchy of a file system) for the object using information from parent iNodes (e.g., iNodes for with directories associated with the object). The full path is stored in the backup catalog 130. Accordingly, the restore module 134 uses the backup catalog 130 to directly seek the iNode information stored on the tape that is associated with an object to be restored according to another embodiment.

Alternatively, the copy module 132 and the restore module 134 may use the mapping service in conjunction with the Table of Contents portion of the backup file 124 to perform file-level restoration from the backup file 124 on the tape. For example, the copy module 132 generates the extent information 128 during generation of the Table of Contents. The restore module 134 uses the extent information 128 to locate data on the tape and interfaces with the mapping service to restore the data from the tape to an appropriate position in the volume 110.

Figure 2:
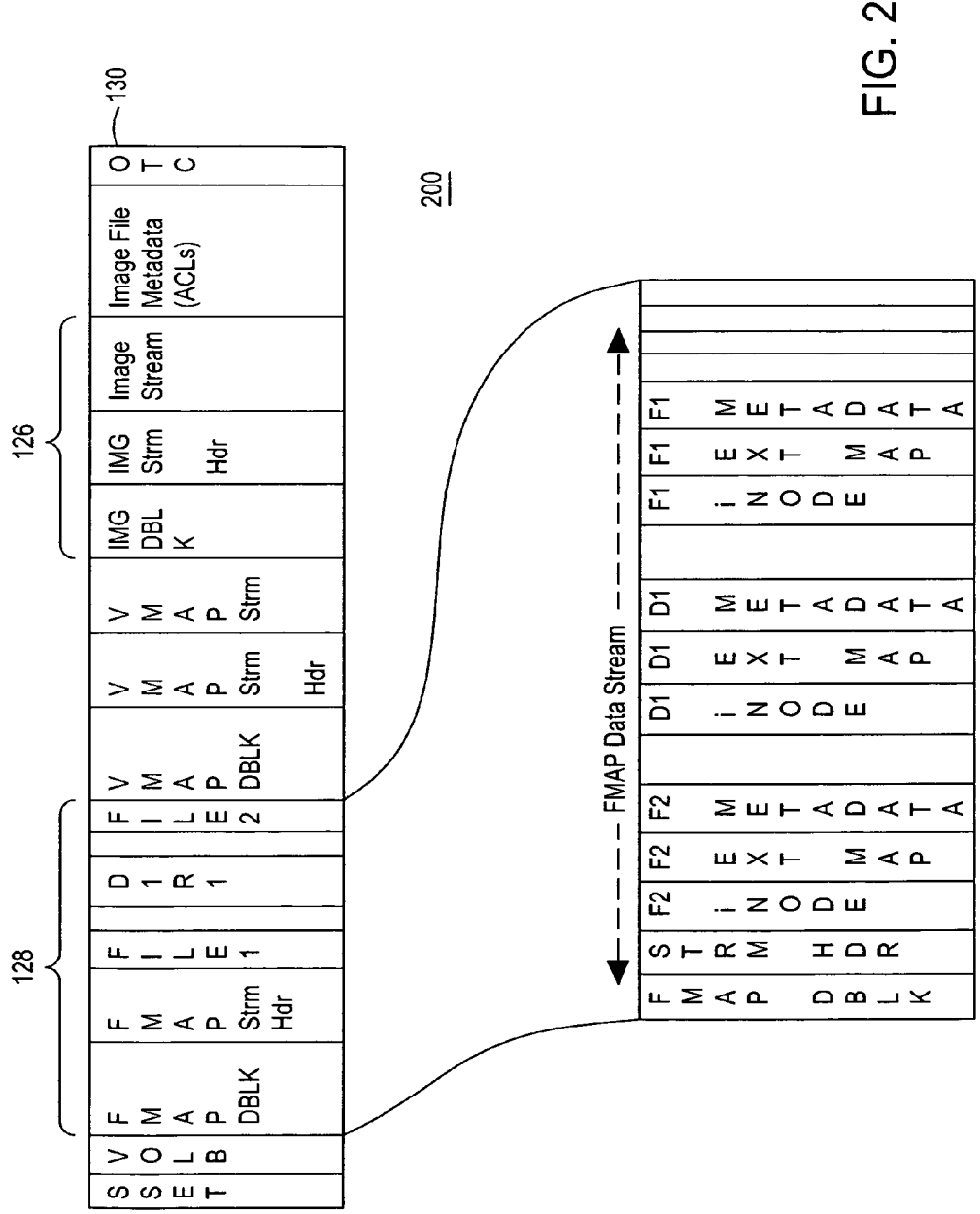
FIG. 2 illustrates a manner of storing a backup file upon a tape according to one or more embodiments of the present invention.

FIG. 2 illustrates a manner of storing a backup file upon a tape 200 according to one or more embodiments of the present invention. As mentioned above, a tape drive in a tape library (e.g., the tape library 116) is configured to store data blocks onto magnetic tape, such as the tape 200.

The tape 200 comprises data blocks that form the extent information 128, the fragment files 126 and the backup catalog 130 as well as other information that may be needed to perform file-level restoration from the tape 200 (e.g., Backup file metadata, such as Access Control Lists, creation data and the like). In one embodiment, the extent information 128 is a FMAP (File Map) data stream on the tape 200. The FMAP data stream comprises iNode information, extent mapping information and metadata (e.g., Access Control Lists, resparse tags) for each object (e.g., an object of the plurality of objects 114). In one embodiment, a portion of the extent information 128 may be sorted in tape-seek order.

The fragment files 126 are stored separately on the tape 200 after the extent information 128. In one embodiment, one or more data blocks in a tape format (e.g., MICROSOFT Tape Format (MTF)) precede each fragment file of the fragment files 126 on the tape 200. Each MTF data block comprises information regarding the each fragment file (e.g., name, creation data and the like). Another MTF data block is associated with a MTF stream, which is used to store data that comprises the fragment file.

Lastly, the backup catalog 130 is stored on the tape 200. The backup catalog 130 is illustrated as On Tape Catalog (OTC) in FIG. 2. The backup catalog 130 comprises locations (e.g., byte offsets from the beginning of the FMAP data stream) for each iNode as well as a size of the iNode on the tape 200. After the FMAP data stream is written to the tape 200, the backup catalog 130 is updated with such locations.

Figure 3:
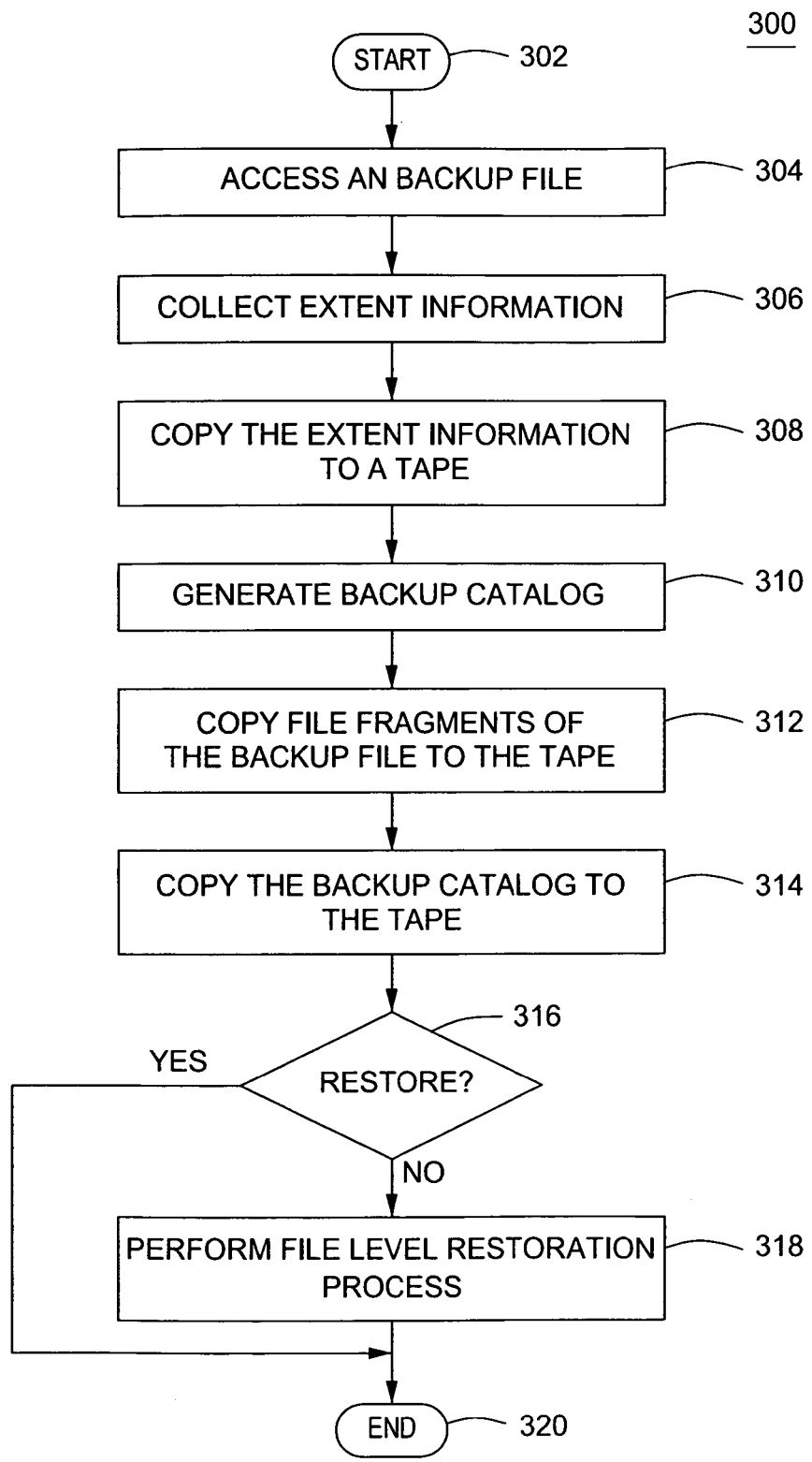
FIG. 3 is a flow diagram of a method for processing a backup file to facilitate file-level restoration according to one or more embodiments of the present invention.

FIG. 3 is a flow diagram of a method 300 for processing a backup file to facilitate file-level restoration according to one or more embodiments of the present invention. The method 300 begins at step 302 and proceeds to step 304.

At step 304, a backup file is accessed. At step 306, extent information regarding a plurality of file system objects (e.g., the plurality of objects 114) in the backup file is collected. At step 308, the extent information is copied to a tape (e.g., the tape 200). At step 310, a backup catalog is generated. At step 312, one or more fragment files that form the backup file are copied to the tape. As the one or more fragment files are stored to the tape, the backup catalog is updated with locations on the tape of the one or more fragment files. At step 314, the backup catalog is copied to the tape.

At step 316, a determination is made as to whether to restore a file system object. The step 316 may be performed at any point in time after the backup file is copied to the tape. If the file system object is to be restored, the method 300 proceeds to step 318. At step 318, a file-level restoration process is performed on the tape. If the file system object is not to be restored, the method 300 proceeds to step 320. At step 320, the method 300 ends.

Figure 4:
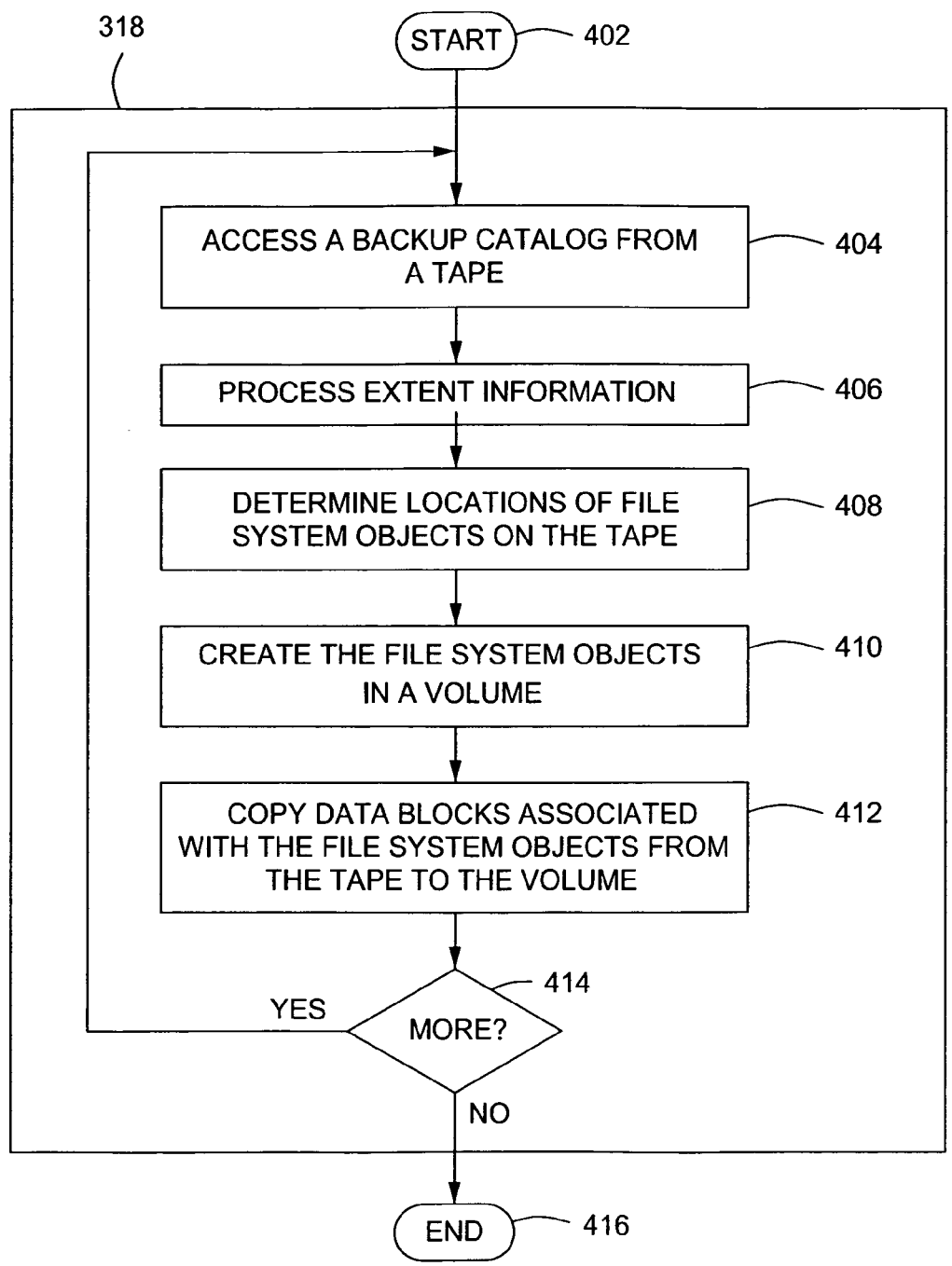
FIG. 4 is a flow diagram of a method for performing file-level restoration on a backup file according to one or more embodiments of the present invention.

FIG. 4 is a flow diagram of a method 400 for performing file-level restoration on a backup file according to one or more embodiments of the present invention. The method 400 begins on step 402 and proceeds to step 404.

At step 404, a backup catalog is accessed. The backup catalog may be stored in the memory 122 as depicted in FIG. 1 or on the tape 200 as depicted in FIG. 2. In one embodiment, the backup catalog is associated with a backup file for a particular point-in-time (e.g., a latest incremental backup file in a backup chain). At step 406, extent information is processed. In one embodiment, the backup catalog is read from a tape and used to identify portions of the extent information on the tape that are associated with file system objects requested for restoration. At step 408, locations of the file system objects on the tape are determined. At step 410, the file system objects are created in a volume (e.g., space is allocated for the file system objects on the volume). In one embodiment, file system information (e.g., a MFT) associated with the volume is updated with entries describing the file system objects.

At step 412, data blocks (e.g., maintained in fragment files) associated with the file system objects are copied from the tape to the volume. At step 414, a determination is made as to whether any more backup files are needed to restore the file system objects (e.g., one or more previous backup files in the backup chain, such as a previous incremental backup file or a base backup file). If more backup files are needed, the method 400 returns to step 404. If no backup files are needed, the method 400 proceeds to step 416. At step 416, the method 400 ends.

In one embodiment of the method 400, the file system objects may be restored from the backup chain in reverse order where the file-level restoration process begins with a last incremental backup file and proceeds to each previous incremental backup file, as mentioned above. At each previous incremental backup file, data blocks associated with the file system objects that was not superseded in a later, already processed incremental backup file are restored since such data represents the most recently modified, and/or added version of the file system objects. The file-level restoration process stops at the base backup file or when the file system objects have been fully restored.

Alternatively, the file system objects may be restored from the backup chain in tape sequential or creation time order where the file-level restoration process beings with the base backup file and proceeds to each subsequent incremental backup file. At the base backup file, the file-level restoration process restores data blocks associated with the file system objects. At each subsequent incremental backup file, data blocks associated with the file system objects are restored since such data represents a modified and/or added version of the file system objects. In one embodiment, extent information associated with the subsequent incremental backup file identifies one or more modified or added data blocks associated with the file system objects. Accordingly, the data blocks overwrite older versions of the file system objects. If a file system object of the file system objects has been deleted, a currently restored version of the deleted file system object is also deleted. Furthermore, the deleted file system object is removed from a file system (e.g., the file system information 112, such as a MFT of FIG. 1) that represents a volume (e.g., the volume 110 of FIG. 1). For example, MFT entries (e.g., files and directories) associated with the deleted file system object (e.g., attributes) are removed.

In one embodiment, a backup catalog for the subsequent incremental file includes information (e.g., the deleted object information 131 of FIG. 1) regarding the deletion of the file system object since a previous incremental backup file. As the incremental backup file is copied "as is" onto the tape, the backup catalog is updated to indicate the deleted file system object. For example, file system metadata of the backup catalog associated with the subsequent incremental backup file identifies one or more modified, deleted or added file system objects since the previous incremental backup file. The file-level restoration process stops at the latest incremental backup file in the backup chain or a backup file associated with a target point-in-time.

Figure 5:
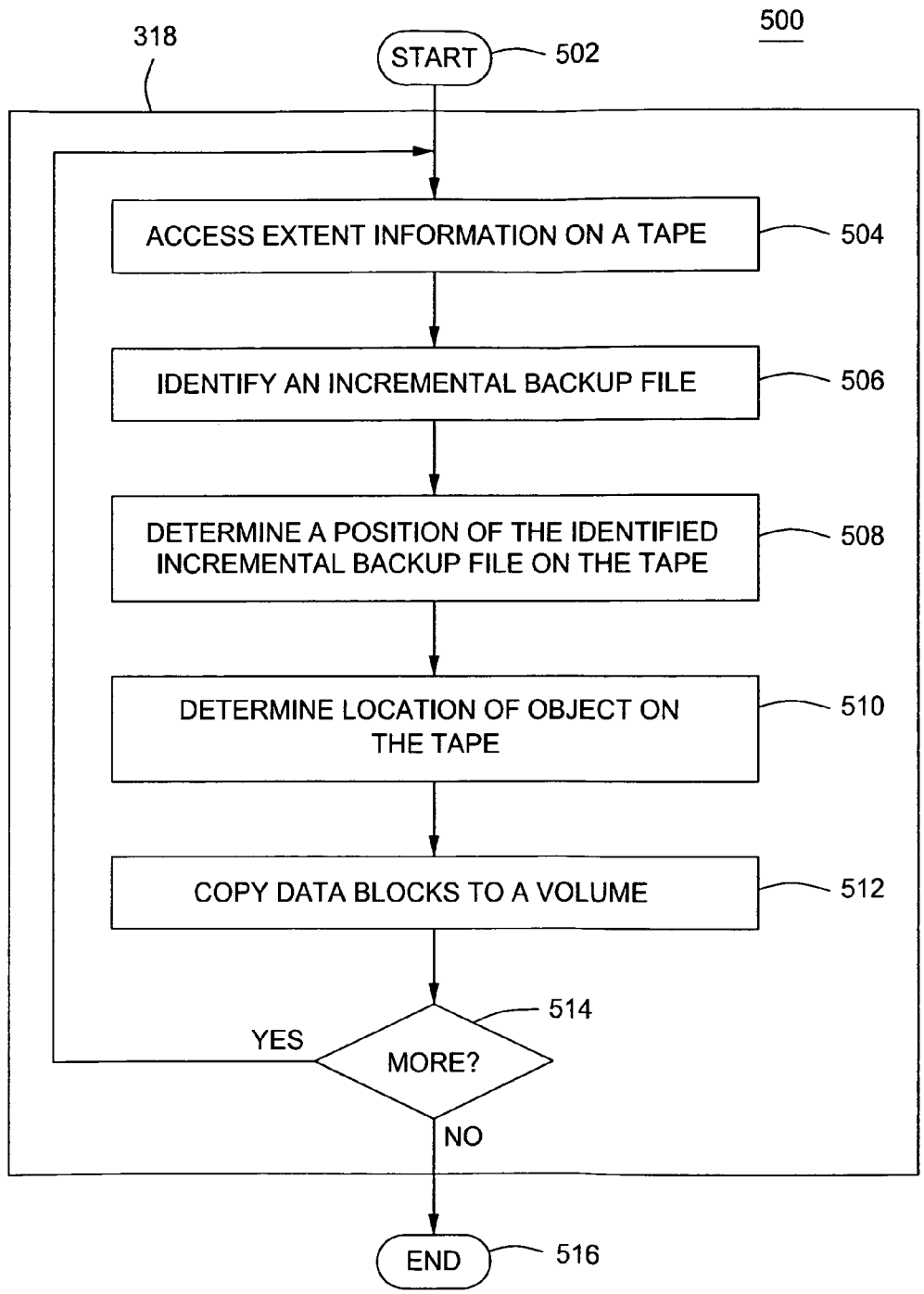
FIG. 5 is a flow diagram of a method for performing file-level restoration on an incremental backup file according to one or more embodiments of the present invention.

FIG. 5 is a flow diagram of a method 500 for performing file-level restoration on an incremental backup file according to one or more embodiments of the present invention. The method 500 is an embodiment of the method 400. The method 500 begins at step 502 and proceeds to step 504.

At step 504, extent information on a tape is accessed. As mentioned above, a restore module uses a backup catalog to locate the extent information on the tape. At step 506, an incremental backup file required for restoring a file system object is identified. In one embodiment, the extent information is generated to include information that indicates which incremental backup file in a backup chain comprises data that represents one or more portions of the file system object. In another embodiment, the identified incremental image comprises data associated with a latest version of the file system object. For certain types of file system objects (e.g., MICROSOFT Office Documents), if the file system object was changed during an incremental backup, then the incremental image comprises a complete and latest version of the file system object. Thus, the restore module only needs to access a portion of the tape comprising the identified incremental image to restore the entire file system object. In another embodiment, the extent information is generated to include information indicating that a latest incremental comprises each and every portion of the file system object. In this embodiment, the restore module only needs to access a portion of the tape comprising the latest incremental image to restore the entire file system object.

At step 508, a position of the identified backup file on the tape is determined. A tape drive comprising the tape moves to the position of the identified backup file. At step 510, a location on the tape for the file system object is determined. The location is indicated by the extent information. At step 512, data blocks that form a portion of the file system object are copied to a volume. The tape drive streams data blocks from areas on the tape associated with the file system object where such areas on the tape are denoted by the extent information. The data blocks are streamed to appropriate locations on the volume as indicated by various metadata (e.g., file system metadata, volume metadata and the like), as explained above. At step 514, a determination is made as to whether more incremental backup files need to be processed in order to complete the file-level restoration process. If more incremental backup files need to be processed in order to complete the file-level restoration process, the method 500 returns to step 504. For example, if another incremental backup file includes a data block required to restore the file system object, then one or more incremental images still need to be processed to complete the file-restoration process. If no more incremental backup files need to be processed in order to complete the file-level restoration process, the method 500 proceeds to step 516. At step 516, the method 500 ends.

Figure 6A:
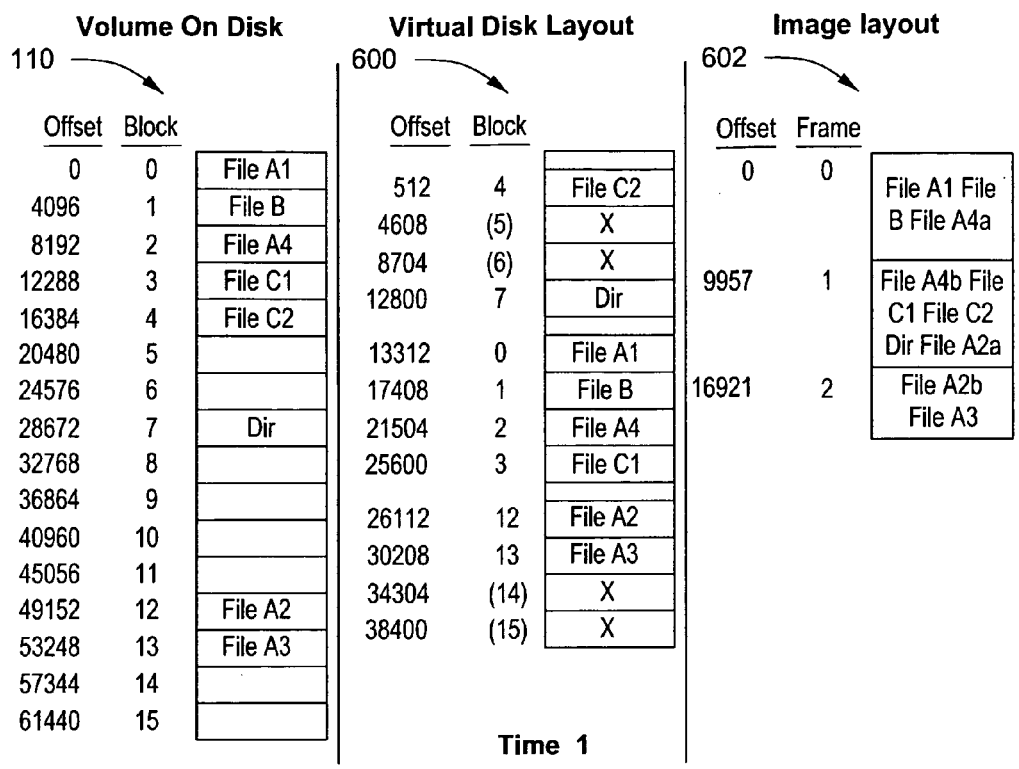
FIGS. 6A-C illustrate extent information generation for a plurality of backup files in a backup chain according to one or more embodiments of the present invention.
Figure 6B:
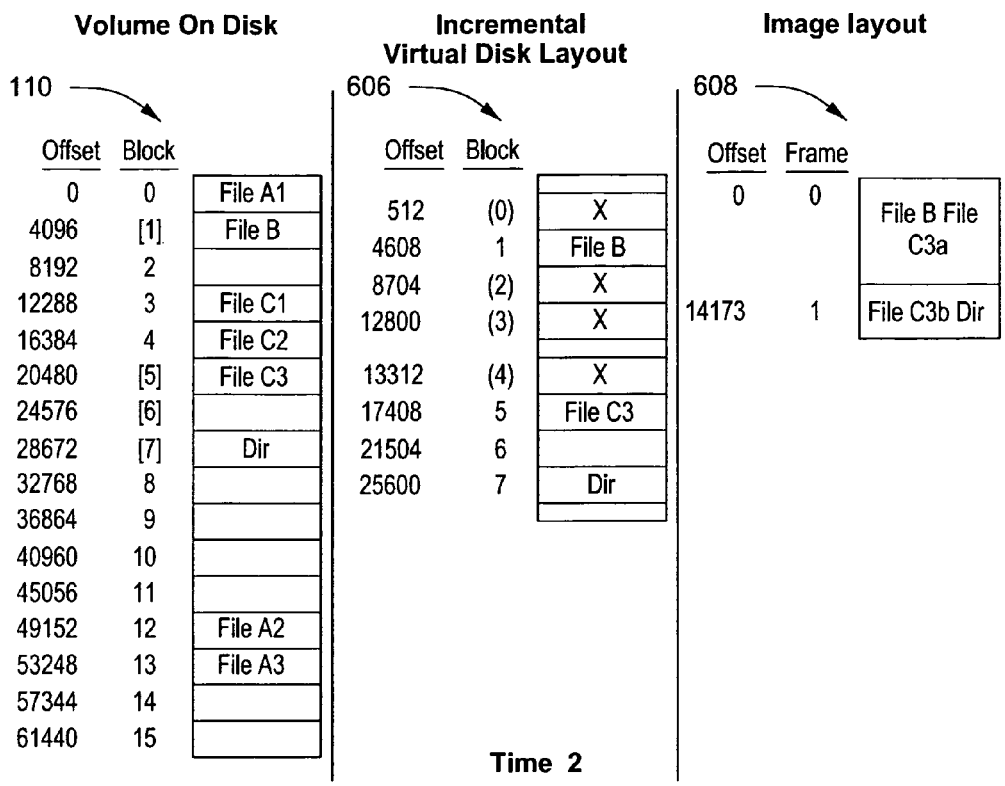
Figure 6C:
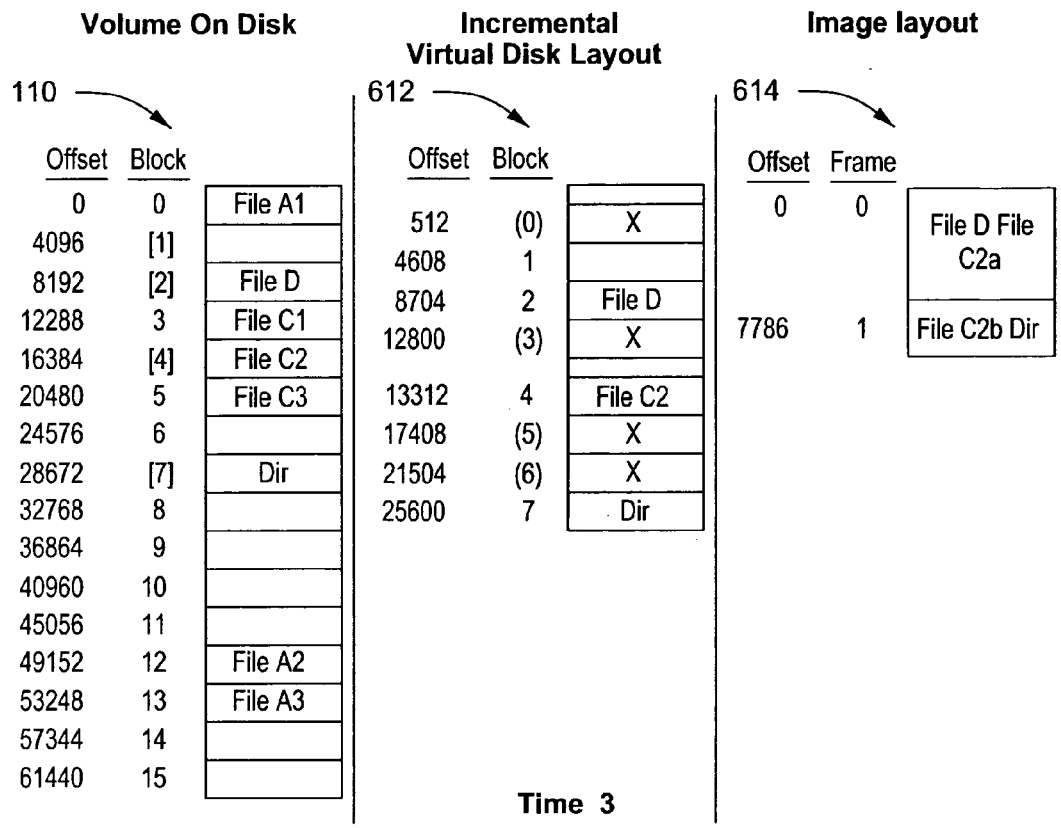

FIGS. 6A-C illustrate extent information generation for a plurality of backup files in a backup chain associated with various points in time. Specifically, the extent information is generated for a virtual disk file 600 and an image file 602 at Time 1, a virtual disk file 606 and an image file 608 at Time 2, and a virtual disk file 612 and an image file 614 at Time 3.

With respect to FIG. 6A, a layout (e.g., file system information, such as the file system information 112 of FIG. 1) of a volume on disk represents the volume 110 at Time 1 and indicates that the volume 110 comprises File A, File B, File C and Dir. Each block in the layout of the volume 110 is four kilobytes (4K) in size. File A comprises four portions: File A1, File A2, File A3 and File A4, in that order. Similarly, File C comprises two portions: File C1 and File C2.

A layout of the virtual disk file 600 represents a base virtual disk file and a backup copy of the volume 110 at Time 1. The virtual disk file 600 is divided into a plurality of superblocks where each superblock is four blocks (16K) in size. A superblock is allocated whenever data is written to any block in the superblock. Storage space for other blocks in the superblock is allocated at the same time, but such blocks are not marked as used. An unused block is represented by an X mark and a block number in parenthesis. For instance, Blocks 5, 6, 14 and 15 are allocated but unused. The virtual disk file 600 comprises three superblocks: a first superblock comprising blocks 4-7, a second superblock comprising blocks 0-3 and a third superblock comprising blocks 12-15. A fourth superblock comprising blocks 8-11 is not allocated in the virtual disk file 600 because the volume 110 has not yet used the blocks 8-11. Notably, each superblock may also comprise a 512 byte header, which is used to identify allocated and/or unused blocks in the superblock. The superblocks may not be arranged in numerical order but rather in the order that the superblocks were allocated.

A layout of the image file 602 represents a base image and a backup copy of the volume 110 at Time 1. The image file 602 comprises three frames in which each frame comprises a large amount of data. Offsets for the image file 602 differ from offsets for the virtual disk file 600 because the image file 602 does not include unused sectors and/or data within the image file 602 is compressed. Furthermore, a file (e.g., File C) may be split amongst the three frames. The last file in a frame rarely ends at the end of the frame and must continue into a next frame. Thus; a first portion of File A4 is at the end of frame 0 and the last portion is at the beginning of frame 1. Moreover, the file cannot be accessed independently. Instead, one or more larger frames that include the file must be accessed.

Extent information 610 at Time 1 is generated for the plurality of files in the virtual disk file 600 and the image file 602. With respect to the virtual disk file 600, the extent information 610 comprises an offset and a number of bytes (e.g., a multiple of the block size) to read, as explained above. Whereas, the extent information 610 for the image file 602 comprises an offset and a size of a frame, an offset and a number of bytes to read within the frame after data within the frame has been unencrypted and decompressed. Since the data will expand, the offset within the frame may be a value that is larger than the size of the frame.

With respect to FIG. 6B, the virtual disk file 606 and the image file 608 are incremental backup files associated with files that were modified, deleted and/or added after the base backup file (e.g., the virtual disk file 600 or the image file 602). A modified data block in the volume 110 is represented by a bracket around the block number. For example, between Time 1 and Time 2, blocks 1, 5, 6 and 7 were modified in the volume 110. In particular, File B was modified in place, File C grew to include a third block (block #5) and File A was truncated to three blocks from four blocks eliminating block 2, which had been associated with File A4. Notably, block 2 was not actually modified. Rather, the file system information associated with DIR in block 7 was modified to indicate that File A was truncated to three blocks. Block 6 was also modified, but did not originally comprise any file data. At time 2, block 6 still does not comprise any data. Hence, block 6 was used for a temporary file, which caused the block 6 to be modified.

The extent information 610 at Time 2 may be generated in accordance with various embodiments of the present invention. In one or more embodiments, File Only extent information comprises only full extent information for data that is captured in the incremental backup file (e.g., the virtual disk file 606 or the incremental image file 608). If only a portion of a file has been modified and captured in the incremental backup file, then a single value in the File Only extent information represents each portion of the file that was not modified, and therefore not contained in the incremental backup file. For example, between Time 1 and Time 2, only a third block of File C was modified. The File Only extent information for File C indicates that a first 8192 bytes of file C are not contained in the incremental backup file and a last 4096 bytes are stored within the incremental backup file. Using the File Only extent information, the file-level restoration process must process a backup file associated with a previous point-in-time (e.g., the virtual disk file 600 or the image file 602) in order to locate the first 8192 bytes of File C. The file-level restoration process is repeated until arriving at a base virtual disk or a base image file, which should contain any missing data that was not present in any subsequent incremental backup file. Furthermore, extent information for each previous incremental backup file is examined until all of the data is restored. Some of previous incremental backup files may not comprise any data for File C and may be skipped.

In another embodiment, the extent information 610 at Time 2 is Chain extent information. The Chain extent information specifies which backup file in a backup chain comprises data associated with a particular file. The Chain extent information enables access to the backup files in the backup chain that comprises such data without examining extent information from previous points-in-time. The Chain extent information comprises an identifier for the backup file that comprises each specific block. For example, VdT1 denotes a virtual disk file at Time 1 (i.e., the virtual disk file 600). As another example, IT1 denotes an image file at Time 1 (i.e., the image file 602).

Notably, none of the blocks of File A were actually modified at Time 2, but the extent information 610 still includes an entry for File A because the size changed. If extent information was not generated for File A and/or the extent information 610 did not include the entry for File A, then the size of File A would still be 16K as indicated at time 1 rather than 12K.

With respect to FIG. 6C, the virtual disk file 612 and the image file 614 are incremental backup files associated with files that were modified, deleted and/or added after a previous incremental backup file (e.g., the virtual disk file 606 or the image file 608 at Time 2). Between Time 2 and Time 3, blocks 1, 2, 4 and 7 were modified in the volume 110. Extent information 616 (e.g., File Only extent information and/or Chain extent information) is generated for each file that was modified in any way between Time 2 and Time 3. Extent information is not generated for any file that was not modified or that was deleted by time 3. A backup catalog for Time 3 comprises information indicating that File A is unmodified since Time 2 and File B, which existed at Time 2, is no longer present. In one embodiment, deleted object information (e.g., the deleted object information 131 of FIG. 1) may be stored in the backup catalog to indicate that File B was deleted by Time 3. Since the extent information 616 does not specify File A as being deleted or modified, File A still exists at Time 3 and is equivalent to File A at Time 2. Accordingly, a backup catalog at time 2 may be used to restore File A. Alternatively, the backup catalog at time 3 could include an entry for File A, but refer to a portion of the extent information 610 at Time 2. In either embodiment, since File B is not included within the backup catalog for Time 3, File B was deleted between Time 2 and Time 3.

The file-level restoration process may be performed on any of the plurality of files for any of the various points in time. For example, File C may be restored to a version that existed at Time 3, as depicted in FIG. 6 by a layout of the volume 110, from either the virtual disk file 612 or the image file 614.

In one embodiment, the file-level restoration process is performed in reverse order using File Only extent information. Based on the File Only extent information at Time 3, File C is three blocks in size, but only data for a second block is actually stored in the virtual disk file 612 or the image file 614. The second block can be accessed from the virtual disk file 612 by reading 4096 bytes at offset 13312. The second block can be accessed from the image file 614 by reading 7786 bytes at offset 0 (i.e., frame 0) into a frame memory, decrypting and decompressing frame 0 and then, accessing 3456 bytes at offset 13852 within frame 0. The remaining bytes of the second block are obtained by reading 5678 bytes at offset 7786 (i.e., frame 1) into frame memory, decrypting and decompressing frame 1 and then, accessing the remaining 640 bytes at offset 92 within frame 1. At this point, the file-level restoration process examines the File Only extent information for Time 2 and determines that the incremental backup file at Time 2 (i.e., the virtual disk file 606 or the image file 608) comprises data for a third block of File C. As such, the third block is restored in a manner similar to the restoration of the second block.

Finally, the file-level restoration process examines the extent information 604 for Time 1 and determines that the base backup file at Time 1 (i.e., the virtual disk file 600 or the image file 602) comprises data for a first block of File C and a previous version of the second block of File C. As such, the first block is restored in accordance with the embodiment described. Since a more recent version of the second block has already been restored, there is no need to restore the previous version of the second block and the file-level restoration process may ignore a portion of the extent information 606 associated with the second block of File C. File C at Time 3 is now fully restored.

In another embodiment, the file-level restoration process is performed in any order (e.g., reverse or forward) using Chain extent information. In one embodiment, an optimal order accesses the data on the tape in sequential order, which minimizing tape movement. As illustrated, the Chain extent information at Time 3 is a portion of the extent information 616 at Time 3. Based on the Chain extent information at Time 3, File C comprises three blocks. More importantly, the Chain extent information at Time 3 indicates that the first block is stored in the base backup file at Time 1 (i.e., the virtual disk file 600 or the image file 602), the second block is stored in the incremental backup file at Time 3 (i.e., the virtual disk file 612 or the image file 614), and the third block is stored in the incremental backup file at Time 2 (i.e., the virtual disk file 606 or the image file 608).

Since the Chain extent information indicates the backup files and blocks within the backup files that are needed to restore a file system object such as File C, the file-level restoration process may access the backup files in any order rather than strictly reverse or strictly forward. For example, the file-level restoration may be performed in sequential or tape-seek order (e.g., an order in which the blocks required to restore a file system object (e.g., File C) are stored on a tape). In one embodiment, the Chain extent information is sorted in tape-seek order to facilitate the file-level restoration process in tape-seek order. In operation, the file-level restoration process examines a first portion of the Chain extent information associated with a first extent (i.e., first extent on the tape), moves to an area of the tape where the first extent is stored, extracts the first extent, examines a second portion of the Chain extent information associated with a second extent, moves to an area of the tape where the second extent is stored, extracts the second extent and continues to a next extent on the tape until the file system object is restored.

File C may be restored from the backup chain while ignoring extent information for earlier points-in-time (i.e., the extent information 604 and the extent information 610) since the Chain extent information for File C is available for a desired point-in-time (i.e., Time 3). If the Chain extent information were not available for File C at Time 3 (e.g., File C was not modified between Time 2 and Time 3), the file-level restoration process determines an earlier point-in-time associated with a most recent modification of File C and examines Chain extent information for File C at the earlier point-in-time.

In yet another embodiment, the file-level restoration process is performed in forward order. In order to restore File C, the file-level restoration process starts with the base backup file and examines the extent information 604 at Time 1. The file-level restoration process determines that File C is 8K in size and restores the first block and the second block from the base backup file (i.e., the virtual disk file 600 or the image file 602) to a newly created file. The file-level restoration process proceeds to Time 2 and determines that File C has increased in size to 12K the extent information 610. Accordingly, the file-level restoration process reads the third block from the incremental backup file at Time 2 (i.e., the virtual disk file 606 or the image file 608) and appends the third block to the newly created file. Lastly, the file-level restoration process proceeds to Time 3 and determines that the second block of File C was modified. The file-level restoration process reads the modified second block and replaces data associated with the previous second block in the newly created file. If File C had been truncated, the file-level restoration process would read data that existed before File C was truncated and then, delete the data after the truncation.

While the foregoing is directed to embodiments of the present invention, other and further embodiments of the invention may be devised without departing from the basic scope thereof, and the scope thereof is determined by the claims that follow.

The invention claimed is:

1. A method comprising:
   querying a backup catalog, wherein
      the backup catalog comprises information that identifies locations of various portions of extent information,
      the extent information is stored on a sequential storage device;
      the extent information comprises offset information for a plurality of objects stored in a backup file, and
      the backup file is block-based, and
      the backup file is stored on the sequential storage device;
   identifying a location of a first portion of the extent information based on the querying, wherein
      the first portion of the extent information corresponds to an object of the plurality of objects; and
   identifying at least one data block using the first portion of the extent information, wherein
      the at least one data block comprises at least a portion of the object.

2. The method of claim 1, further comprising:
   restoring data from the backup file stored on the sequential storage device, wherein the sequential storage device comprises a tape.

3. The method of claim 2, wherein restoring the data further comprises:
   restoring the at least one data block from the backup file as stored on the tape using the first portion of the extent information.

4. The method of claim 3, wherein restoring the at least one data block further comprises:
   creating a first file system object on a volume;
   reading the at least one data block from the tape using the first portion of the extent information; and
   writing the at least one data block to the first file system object.

5. The method of claim 4 further comprising:
   processing deleted object information associated with the object; and
   deleting a data block of the at least one data block from the first file system object in accordance with the deleted object information.

6. The method of claim 2, wherein
   the backup catalog is associated with a backup chain,
   the backup chain comprises a base backup file and a plurality of incremental backup files, and
   the restoring the data further comprises
   identifying at least one file of the backup chain that comprises at least one required data block required to restore the file system object, and
   restoring the at least one required data block from the at least one file as stored on the tape using the extent information.

7. The method of claim 2, wherein
   the backup catalog is associated with a backup chain,
   the backup chain comprises an incremental backup file,
   the incremental backup file is associated with a particular point-in-time, and
   the restoring the data further comprises
   restoring a first data block from at least one previous backup file in the backup chain as stored on the tape using the extent information, wherein the first data block forms at least a portion of the file system object.

8. The method of claim 7 further comprising sorting the extent information in tape-seek order.

9. The method of claim 1 further comprising:
   serializing the extent information to the sequential storage device.

10. The method of claim 1, further comprising:
    forming the extent information from at least one of file system metadata, volume metadata, or file offset mapping information associated with the backup file.

11. The method of claim 1, wherein
    the extent information comprises an identifier for a first backup file in a backup chain, and
    the first backup file comprises the at least one data block.

12. An apparatus comprising:
    a central processing unit (CPU) coupled to a memory, the memory comprising a restore module configured to
       query a backup catalog, wherein
          the backup catalog comprises information that identifies locations of various portions of extent information;
          the extent information is stored on a sequential storage device;
          the extent information comprises offset information for a plurality of objects stored in a backup file, and
          the backup file is block-based, and
          the backup file is stored on the sequential storage device,
       identify a location of a first portion of the extent information based on the querying, wherein
          the first portion of the extent information corresponds to an object of the plurality of objects, and
       identify at least one data block using the first portion of the extent information, wherein
          the at least one data block comprises at least a portion of the object.

13. The apparatus of claim 12, wherein the restore module is further configured to:
    access the object on the sequential storage device using the first portion of the extent information, wherein
       the sequential storage device comprises a tape; and
    restore the at least one data block from the tape using the first portion of the extent information.

14. The apparatus of claim 13, wherein the restore module is further configured to:

create a first file system object in a volume;
access the at least one data block on the tape using the first portion of the extent information; and
copy the at least one data block to the first file system object.

15. The apparatus of claim 13, wherein
the backup catalog is associated with a backup chain,
the backup chain comprises a base backup file and a plurality of incremental backup files, and
the restore module is further configured to
identify at least one file of the backup chain that comprises at least one required data block required to restore the file system object and
restore the at least one required data block from the at least one file as stored on the tape using the extent information.

16. The apparatus of claim 13, wherein
the backup catalog is associated with a backup chain,
the backup chain comprises an incremental backup file,
the incremental backup file is associated with a particular point-in-time, and
the restore module is further configured to
restore a first data block from at least one previous backup file of the backup chain as stored on the tape using the extent information, wherein the a first data block forms at least a portion of the file system object.

17. A system comprising:
a computer, comprising a volume;
a backup system for backing up data stored within the volume, comprising:
a restore module configured to
query a backup catalog, wherein
the backup catalog comprises information that identifies locations of various portions of extent information,
the extent information is stored on a sequential storage device;
the extent information comprises offset information for a plurality of objects stored in a backup file, and
the backup file is block-based, and
the backup file is stored on the sequential storage device,
identify a location of a first portion of the extent information based on the querying, wherein
the first portion of the extent information corresponds to an object of the plurality of objects, and
identify at least one data block using the first portion of the extent information, wherein
the at least one data block comprises at least a portion of the object; and
a storage system, comprising the sequential storage device.

18. The system of claim 17, wherein the restore module is further configured to:
restore the at least one data block from the sequential storage device using the first portion of the extent information, wherein
the sequential storage device comprises a tape.

19. The system of claim 18, wherein
the backup catalog is associated with a backup chain,
the backup chain comprises an incremental backup file,
the incremental backup file is associated with a first point-in-time,
the backup chain comprises a plurality of backup files, and
the restore module is further configured to
restore the object to the volume from at least one previous backup file of the backup chain as stored on the tape using the extent information, wherein the at least one previous backup file is associated with a point-in-time that is prior to the first point in time.

20. The system of claim 18, wherein the restore module is further configured to:
allocate memory in the volume for the object,
read the at least one data block from the tape using the extent information, and
write the at least one data block to an offset in the volume.

* * * * *